(12) United States Patent
Iyer et al.

(10) Patent No.: US 7,523,175 B1
(45) Date of Patent: Apr. 21, 2009

(54) PROGRAMMATIC INTERFACE TO NETWORK DEVICE OPERATING SYSTEM

(75) Inventors: Anand Iyer, Santa Clara, CA (US); Venkat Kankipati, Santa Clara, CA (US); Srinivasan Nariangadu, San Jose, CA (US); Shankar Natarajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 10/658,912

(22) Filed: Sep. 9, 2003

(51) Int. Cl.
*G06F 15/177* (2006.01)
*G06F 15/173* (2006.01)
*G06F 9/00* (2006.01)
*G06F 9/24* (2006.01)

(52) U.S. Cl. ................. 709/220; 709/221; 709/222; 709/223; 713/1

(58) Field of Classification Search ......... 709/220–223, 709/224; 713/1
See application file for complete search history.

(56) References Cited

U.S. PATENT DOCUMENTS

| | | | |
|---|---|---|---|
| 6,041,325 A * | 3/2000 | Shah et al. ............ 707/10 |
| 6,282,568 B1 * | 8/2001 | Sondur et al. .......... 709/223 |
| 6,321,249 B1 * | 11/2001 | Nesbitt ................. 709/202 |
| 6,581,094 B1 * | 6/2003 | Gao .................... 709/220 |
| 6,957,256 B1 * | 10/2005 | Bradley et al. ......... 709/223 |
| 6,970,869 B1 * | 11/2005 | Slaughter et al. ....... 707/10 |
| 7,013,329 B1 * | 3/2006 | Paul et al. ............ 709/217 |
| 7,017,148 B2 * | 3/2006 | Kumar ................. 717/114 |
| 2002/0035621 A1 * | 3/2002 | Zintel et al. .......... 709/220 |
| 2003/0018764 A1 * | 1/2003 | Shell et al. ........... 709/223 |
| 2003/0037128 A1 * | 2/2003 | Beadles et al. ........ 709/220 |
| 2003/0204578 A1 * | 10/2003 | Yip et al. ............. 709/222 |

OTHER PUBLICATIONS

O'Reilly & Associates, Inc., "Internet Operating System," http://www.openp2p.com/pub/t/76, printed Nov. 11, 2003, pp. 1-3.

Mentor Graphics Corp, "Nucleus Network Management," http://www.mentor.com/nucleus/net_manage.html, printed Nov. 11, 2003, pp. 1-3.

(Continued)

*Primary Examiner*—Moustafa M Meky
*Assistant Examiner*—Philip J Chea
(74) *Attorney, Agent, or Firm*—Hickman Palermo Truong & Becker LLP

(57) ABSTRACT

A method and apparatus for processing a network operating system operation is provided. A network management application that configures and monitors network components transmits a payload containing an XML document to a transport agent. The XML document contains one or more network device operating system operations and associated data. The XML document and associated data is read from the payload and transmitted to a programmatic agent. The programmatic agent parses the XML document containing the operation and associated data, and provides the operation and associated data in a callback to an appropriate network component. The network component processes the operation, and transmits responsive data to the programmatic agent. The programmatic agent creates a responsive XML document containing the responsive data, and transmits the responsive XML document to the network management application. Network management applications may both configure and monitor network device operating system components using operations within the XML document.

38 Claims, 4 Drawing Sheets

OTHER PUBLICATIONS

Microsoft Corporation, "Comparing Windows CE 3.0 and Windows NT 4.0," http://www.microsoft.com/windows/embedded/ce.net/previous/evaluation/compare/ce30..., printed Nov. 11, 2003, pp. 1-22.

David K. Y. Yau, et al., "Resource Management in Software-Programmable Router Operating System," 2001, IEEE Journal on Selected Areas in Communications, vol. 19, No. 3, Mar. 2001, pp. 488-500.

Tzi-cker Chiueh, et al., "Srishti: Operating System Support for Network Devices," http://www.ecsl.cs.sunysb.edu/srishti.html, printed Nov. 11, 2003, pp. 1-2.

Smart Network Devices, Operating Software, Introducing HyNetOS™, http://www.smartnd.com/technology/operating.cfm, printed Nov. 24, 2003, pp. 1-7.

Accelerated Technology, "Network Management," 2002, 6 pages.

* cited by examiner

PROGRAMMATIC INTERFACE TO NETWORK DEVICE OPERATING SYSTEM

FIELD OF THE INVENTION

The present invention relates to network device operating systems.

BACKGROUND OF THE INVENTION

A network device operating system provides for the configuration and monitoring of network components. The appropriate components of the network device operating system may be installed in each network component, thereby creating a single, unified infrastructure for managing resources through a network. The network components may be configured and monitored by an external party, e.g., a management station, using the network device operating system. A network device operating system may connect different platforms, LAN segments, and networking components. Non-limiting, illustrative examples of networking components include standalone routers, router modules for shared-media hubs, switches, PC and workstation file servers, WAN access switches, and ATM-capable PBXs.

Management stations may use multiple interfaces or protocols in communicating with network components when using a network device operating system to perform configuration and monitoring functionality. For example, a command-line interface (CLI) is typically used in the configuration of network components, while the SNMP protocol is used in the management or monitoring of network components. The CLI allows network components to be configured; however, it is difficult to monitor components using CLI because the data generated in response to CLI commands is formatted such that it is easily understood by humans, but not by computers. On the other hand, while the SNMP protocol is designed for performing monitoring functionality, it does not support much configuration functionality.

As a result, network components generally have parsers to interpret and interface with different protocols used to perform configuration and monitoring functionality. However, the use of parsers at each network component to interpret multiple protocols has many disadvantages. First, the use of parsers at each network component has resulted in performance delays because a parser is a bottleneck for the flow of communication. Second, the use of the parsers does not readily facilitate the transmission of information back to the management station. Consequently, if a problem is encountered, information that may allow the management station to determine what went wrong at the network component, e.g., a return code, cannot easily be sent back from the network component to the management station. Finally, much of the communication that is received from network components using parsers is unstructured, which may allow a person to read the information, but the lack of structure makes it difficult for software or other computerized components to properly interpret the information as the format of the information may vary between different transactions and network components.

Accordingly, there is a need for a network device operating system that may process network device operating system operations without incurring the disadvantages of the prior art.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for processing a network device operating system operation is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

According to one embodiment of a method and mechanism for processing a network device operating system operation, initially, one or more network device operating system operations and associated data within an Extensible Markup Language (hereinafter XML) document are received. An application that is responsible for monitoring or configuring a network device operating system component may transmit the XML document. The XML document is parsed to identify the network device operating system operations. A network device operating system component that can process an identified network device operating system operation is selected for each operation.

Thereafter, the associated data is prepared for use by the selected network device operating system component. Finally, an identified network device operating system operation and the prepared data is provided in a callback to the selected network device operating system components. Network management applications may both configure and monitor network device operating system components using operations within the XML document.

Architecture Overview

Figure 1:
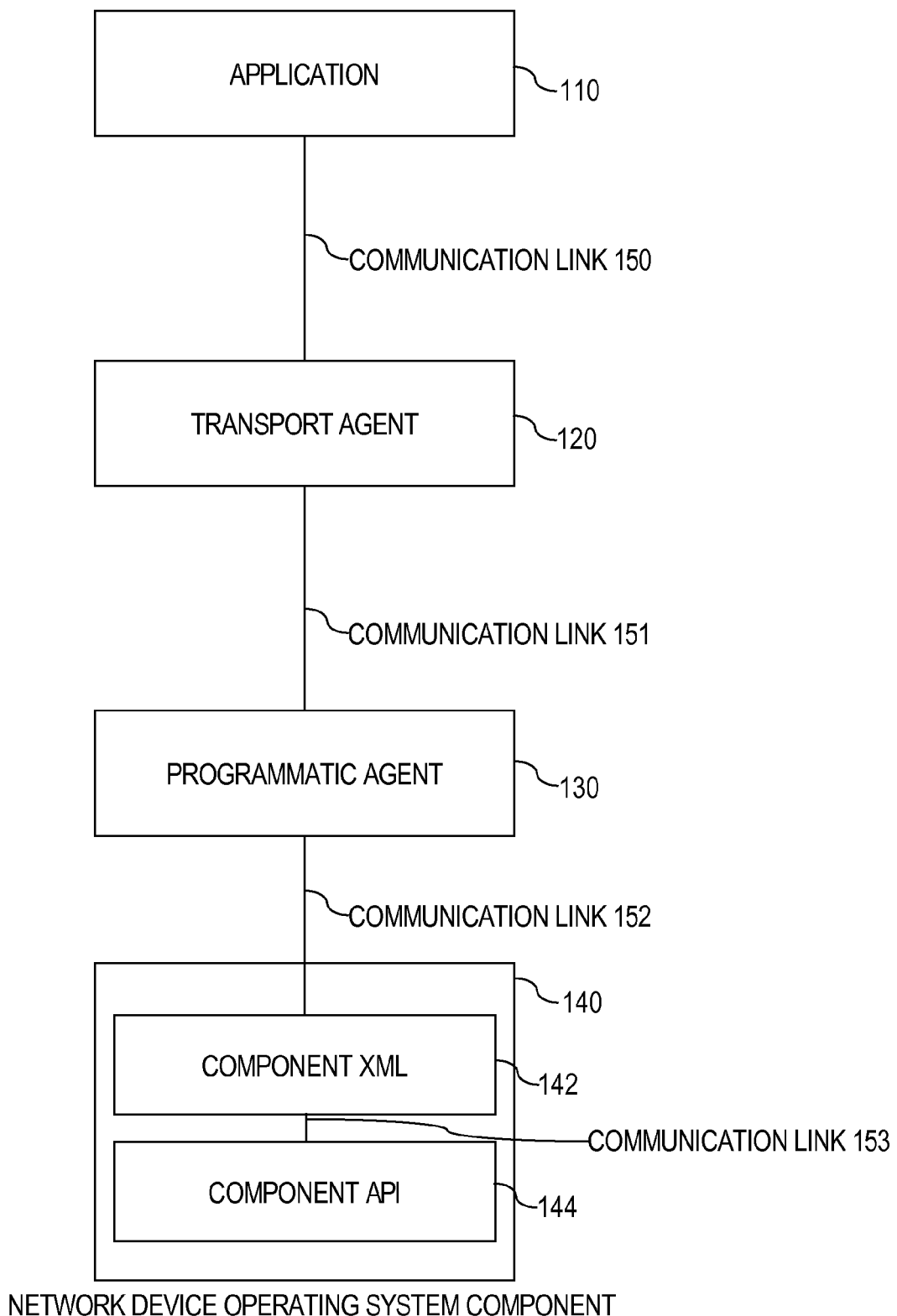
FIG. 1 is a block diagram of a network device operation system arrangement.

FIG. 1 is a block diagram of a network device operation system arrangement 100. In an embodiment, network device operation system arrangement 100 includes an application 110, a transport agent 120, a programmatic agent 130, network device operation system component 140, and communications links 150, 151, 152, and 153. The network device operation system component 140 may comprise a component XML 142 and a component API 144.

Application 110 is used broadly to refer to any application or computerized mechanism that performs configuration and monitoring functionality and is capable of transmitting an XML document. Application 110 may be used to configure and monitor network device operation system components, e.g., network device operation system component 140. In an embodiment, application 110 may be an element management station application or a network management station application. For ease of explanation, only one application 110 is portrayed in FIG. 1; however, embodiments of the invention may use any number of applications, and are not limited to any particular number of applications.

Transport agent 120 is used broadly to refer to any hardware or software component that is capable of communicating with application 110 and programmatic agent 130. Transport agent 120 receives and processes communications from application 110. Communication messages sent from application 110 to transport agent 120 may be referred to as a payload. A payload may contain an XML document. An XML document may contain one or more network device operating system operations. Transport agent 120 is transport agnostic, i.e., it may communicate using a variety of protocols with application 110 over communications link 150.

Programmatic agent 130 is used broadly to refer to any hardware or software component that is capable of communicating with transport agent 120 and network device operation system component 140 and reading and creating documents corresponding to the XML standard. Upon initialization, programmatic agent 130 registers itself with transport agent 120 as an entity to receive an XML document received by transport agent 120.

In an embodiment, programmatic agent 130 is a software entity that receives requests to perform operations on network device operation system component 140 and generates appropriate responses based on the execution status/return codes from the network device operation system component 140.

Network device operation system component 140 is used broadly to refer to any logical entity within an operating system executing on a network device that may be configured or monitored by a network device operation system. For brevity, network device operation system component 140 will hereinafter be referred to as component 140. Non-limiting, illustrative examples of component 140 include, but are not limited to, software on remote access devices, software on multiplexers, software on routers, software on hubs, software on servers, software on switches, and software on PBXs. Component 140 does not need to be configured to read the XML standard, as programmatic agent 130 communicates with component 140 using callbacks that are established when component 140 registers itself upon startup with programmatic agent 130, as explained in the section entitled "Registration of the Component with the Programmatic Agent." For ease of explanation, only one component 140 is portrayed in FIG. 1; however, embodiments of the invention may use any number of components, and are not limited to any particular number of components.

In an embodiment, component 140 includes a component XML 142 and a component API 144. Component XML 142 is a software process executing on component 140. Component XML 142 performs data validation and bounds checking on operations and associated data. Component XML 142 may comprise method handlers and attribute handlers. Method handlers are used to contact component API 144 to perform a method on a supported object, and attribute handlers are used to contact component API 144 to access an attribute on a supported object. As explained in further detail in the section entitled "Registration of the Component with the Programmatic Agent," component XML 142 may be dynamically generated in an embodiment.

Component API 144 is a software process executing on component 140 that is configured to perform specified operations on objects supported by component 140. Each supported object of component 140 has a set of attributes and methods that may be performed on the objects. Component API 144 performs the functionality supported by the method handlers and attribute handlers of component XML 142.

Communications links 150, 151, 152, and 153 may be implemented by any medium or mechanism that provides for the exchange of data between application 110, transport agent 120, programmatic agent 130, and component 140. Examples of communications links 150-153 include, without limitation, a network such as a Local Area Network (LAN), Wide Area Network (WAN), Ethernet or the Internet, or one or more terrestrial, satellite or wireless links.

Some embodiments of network device operation system arrangement 100 may feature additional components other than those graphically portrayed in FIG. 1, while other embodiments of the network device operation system arrangement 100 may not feature all the components graphically portrayed in FIG. 1. Consequently, embodiments of the invention are not limited to those graphically portrayed in FIG. 1, as FIG. 1 is merely illustrative of one embodiment of the invention.

Registration of the Component with the Programmatic Agent

Component 140 uses a schema to store data used in its operation. In an embodiment, component API 144 may expose a data model of the schema, such as by exposing the data model in a file (referred to as a ".PI file"). The data model exposed in the .PI file may describe the name of component 140, as well as all the objects supported by component 140, with their associated attributes and methods. Table 1 is an example of a template for a .PI file according to an embodiment.

TABLE 1 component <component-name>
    version X.Y
    description "..."
    .
    .
    .
    object <object-name$_1$> {config | control}
        description "..."
        [status deprecated]
        [
        instance-id <instance-id-name><instance-id-type>['('<lowerbound>':'<upperbound>')' |

TABLE 1-continued

```
'('enum-val1 '|' ...')' | <maxstringlen>]
            [der-type <derived-type>]
        ]
        attrib <attrib-name><attrib-type>['('<lowerbound>':'<upperbound>')' | '('enum-val1 '|'
...')' | <maxstringlen>]
            description "..."
            [default <default-value>]
            [der-type <derived-type>]]
        attrib [<attrib-name>] <object-name> {ref | obj | union}
            [description "..."]
    end /* object object-name₁ */
    .
    .
    .
    [union fooUnion
        [description "..."]
        /* Two or more attribute definitions exist here */
        .
        .
        .
    end /* end union fooUnion */]
    .
    .
    .
end /* component component-name */
```

In an embodiment, component XML 142 may be dynamically generated based upon the data model exposed in the .PI file. Component 140 may generate component XML 142 based upon the .PI by reading the .PI file, and generating the necessary method handlers and attribute handlers in the component XML 142 based on the exposed data model. As component API 144 performs the functionality of accessing attributes and performing methods on the objects, the method handlers and attribute handlers merely call appropriate APIs in the component API 144, which may be ascertained by examining the available information in the exposed data model. Component 140 may be configured to dynamically generate component XML 142.

In another embodiment, component XML 142 is not dynamically generated, but is generated manually. Component XML 142 may be manually created by a user reviewing information in the .PI file, or information similar to that contained within the .PI file.

Component 140 registers with programmatic agent 130 to facilitate communication between component 140 and programmatic agent 130. To register with programmatic agent 130, component 140 supplies programmatic agent 130 with a data model that describes the schema to which all the objects, attributes of the objects, and method on the objects supported by the component 140 correspond. For example, in an embodiment, component 140 may supply the .PI file to programmatic agent 130.

After the component XML 142 registers with programmatic agent 130, programmatic agent 130 may communicate as necessary with component XML 142. Upon component 140 registering with programmatic agent 130, programmatic agent 130 stores address information to call the appropriate method handlers and attribute handlers in component XML 142 when processing operations on objects supported by the schema in component 140.

Processing Network Device Operating System Operations

Figure 2:
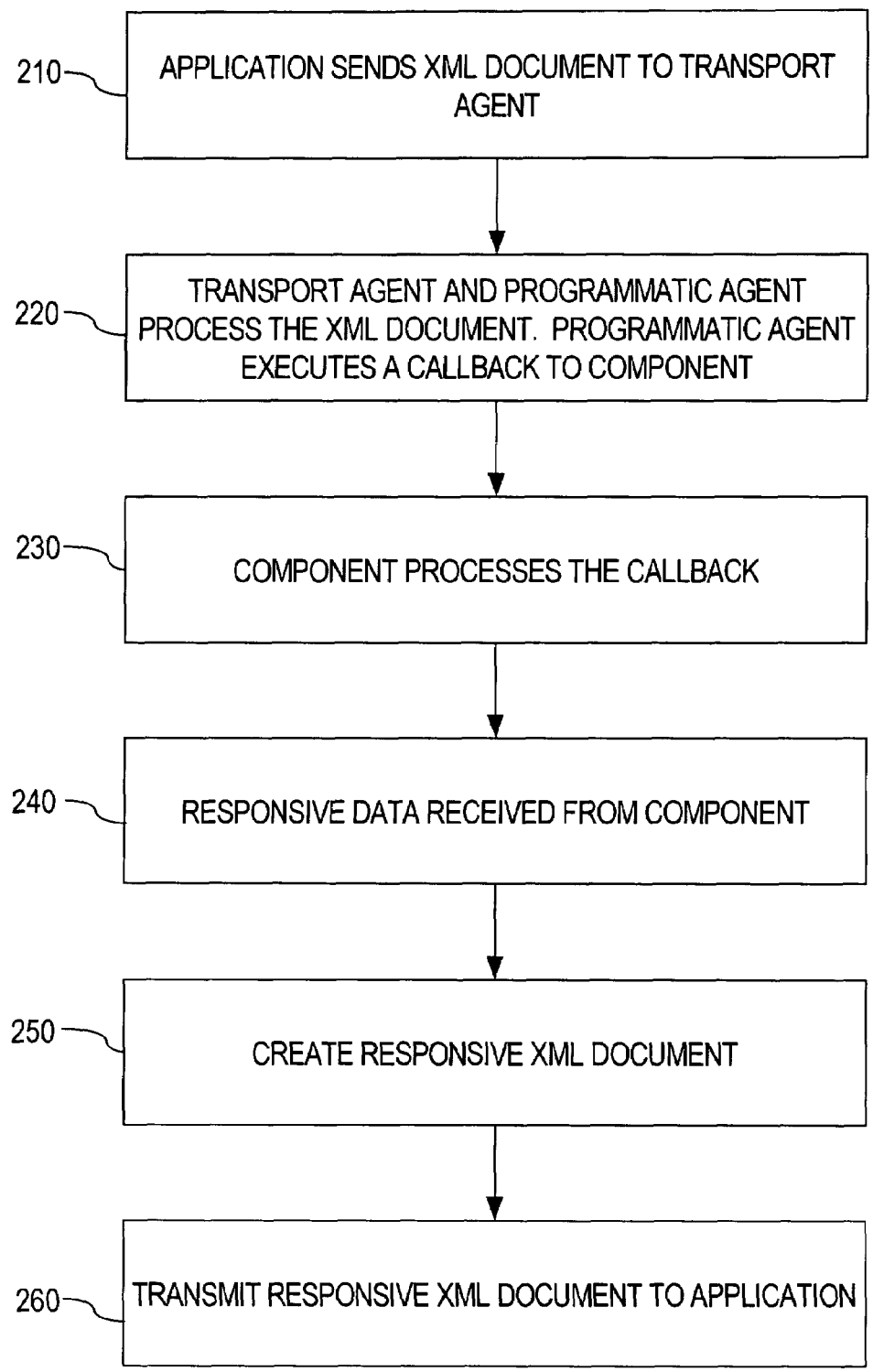
FIG. 2 is a flow chart illustrating the functional steps performed by network device operation system arrangement.

FIG. 2 is a flow chart illustrating the functional steps performed by network device operation system arrangement 100. By performing the steps illustrated in FIG. 2, application 110 may configure and monitor component 140 by transmitting a payload containing an XML document to transport agent 120, and receiving a responsive XML document from transport agent 120.

Initially, in step 210, application 110 transmits a payload containing an XML document that contains one or more network device operating system operations and associated data to transport agent 120. An XML document conforms to the XML standard. A network device operating system operation is any operation that may be performed on component 140 that is directed towards configuring or monitoring component 140. The associated data contained within the XML document may be data that is needed to perform a particular operation on component 140, e.g., the associated data may specify how the operation is to be performed on component 140.

Component 140 exposes a XML data schema that describes how an XML document should be formed to access object, methods, and attributes on the component 140. The XML document transmitted in step 210 should conform to the specifications in the XML data schema. Note that the XML data schema is different than the exposed data model discussed above in the section entitled "Registration of the Component with the Programmatic Agent." Table 2 is an example XML document transmitted in step 210 according to an embodiment.

TABLE 2

```
<request header with directives and version>
    <method₁>
        <component-name₁>
            <object-name₁ instance-id>
                <!-- Attributes that describe the object -->
                <!-- maybe present here -->
                ...
                ...
```

TABLE 2-continued

```
        </object-name₁>
        <!-- An operation can be applied on -->
        <!-- multiple objects in the component -->
        <object-name₂ instance-id>
            ...
            ...
        </object-name₂>
        ...
        ...
    </component-name₁>
    <!-- A method can be applied on multiple components -->
    <component-name₂>
        <object-name₁ instance-id>
            ...
            ...
        </object-name₁>
        <!-- An operation can be applied on -->
        <!-- multiple objects in the component -->
        <object-name₂ instance-id>
            ...
            ...
        </object-name₂>
        ...
        ...
    </component-name₂>
</method₁>
<!-- Multiple operations can be embedded into a -->
<!-- request -->
<method₂>
    <component-name₁>
        <object-name₁ instance-id>
            ...
            ...
        </object-name₁>
        <!-- An operation can be applied on -->
        <!-- multiple objects in the component -->
        <object-name₂ instance-id>
            ...
            ...
        </object-name₂>
        ...
        ...
    </component-name₁>
    <!-- A method can be applied on multiple components -->
</method₂>
...
...
</request header>
<response header with version>
    <method1 status="...">
        <component-name1>
            <object-name1 status="...">
                ...
                ...
            </object-name1>
            <object-name2 status"...">
                ...
                ...
            </object-name2>
        </component-name1>
        <component-name2>
            <object-name1 status="...">
                ...
                ...
            </object-name1>
            <object-name2 status="...">
                ...
                ...
            </object-name2>
        </component-name2>
    </method1>
    <method2 status="...">
        <component-name1>
            <object-name1 status="...">
                ...
                ...
            </object-name1>
```

TABLE 2-continued

```
            <object-name2 status="...">
                ...
                ...
            </object-name2>
        </component-name1>
        <component-name2>
            <object-name1 status="...">
                ...
                ...
            </object-name1>
            <object-name2 status="...">
                ...
                ...
            </object-name2>
        </component-name2>
    </method2>
    ...
    ...
</response header>
```

As Table 2 illustrates, the XML document may contain an operation that may be applied to multiple objects supported by component 140 and a method that may be applied to multiple components 140, and multiple operations may be embedded in the XML document.

In step 220, transport agent 120 and programmatic agent 130 processes the payload containing the XML document transmitted in step 210, and the programmatic agent 130 executes a callback to component 140. Step 220 is explained below in further detail below with reference to FIG. 3, which is a flow chart illustrating the functional steps performed by the transport agent 120 and the programmatic agent 130 according to an embodiment.

Figure 3:
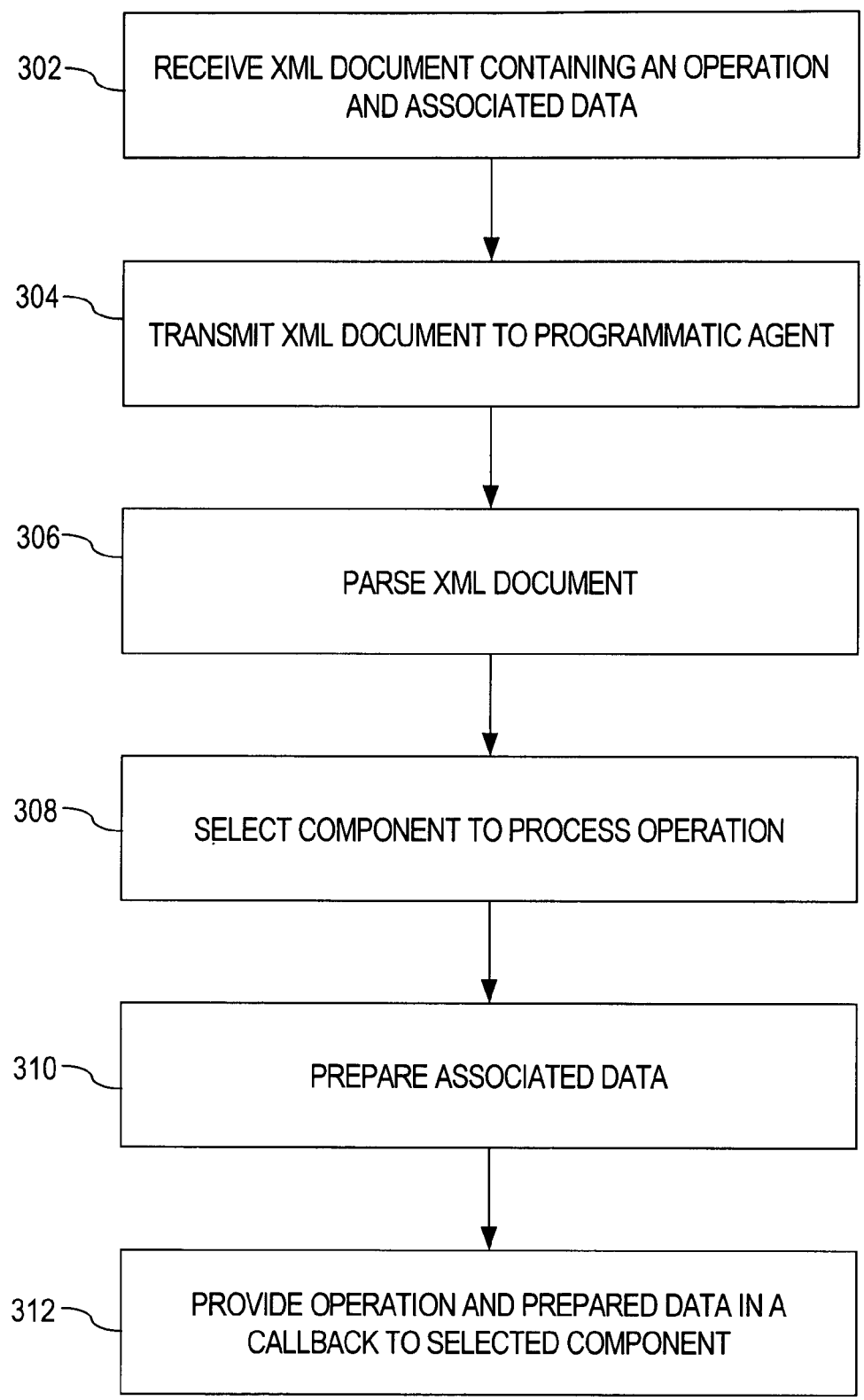
FIG. 3 is a flow chart illustrating the functional steps performed by the transport agent and the programmatic agent.

FIG. 3 is a flow chart illustrating the functional steps performed by the transport agent and the programmatic agent according to an embodiment. In step 302, a payload containing an XML document is received by transport agent 120 that contains one or more network device operating system operations and associated data. The payload received in step 302 was sent by application 110 in step 210. The payload may be sent to transport agent 120 using a variety of transport protocols. Transport agent 120 extracts the XML document from the payload.

In step 304, transport agent 120 transmits the XML document to programmatic agent 130. Programmatic agent 130 previously registered with transport agent 120 to receive XML documents contained in received payloads.

In step 306, the XML document sent in step 304 is parsed by the programmatic agent 130 to identify the one or more network device operating system operations (hereinafter each referred to as "an operation") and associated data.

In step 308, the programmatic agent 130 selects, for each operation, one or more components 140 that are required to process the operation. As each component 140 is registered with the programmatic agent 130 (as explained above in the section entitled "Registration of the component with the programmatic agent"), programmatic agent 130 is able to determine which components 140 support objects that are implicated by an operation. In other words, if an operation involves an object, a method, or an attribute on component 140, programmatic agent 130 can determine that the object, method, or attribute is associated with component 140 using information obtained from the registration of component 140.

In step 310, associated data is prepared for use by the selected components 140. In step 310, any information necessary to perform a callback to component 140 is prepared.

In step 312, the operation and prepared data from step 310 is provided to component 140 using a callback established when component 140 registered with programmatic agent 130. The callback of step 312 may communicate with one or more method handlers or one or more attribute handlers resident in the component XML 142 on one or more components 140.

In step 230, component 140 processes the callback sent by programmatic agent 130. Component XML 142 processes the callback using any method handlers or attribute handlers referenced in the callback. Component XML 142 may validate the prepared data in the callback to ensure that it conforms to a set of rules, e.g., to check that the data contains no errors or is within an expected range.

Component XML 142 invokes one or more functions in component API 144 necessary to perform the operation. Each function in component API 144 invoked by component XML 142 can perform one or more tasks associated with the operation. Component XML 142 may map the prepared data associated with the operation to one or more data structures associated with the one or more functions in component API 144 necessary to perform the operation. The one or more data structures may be supplied to the one or more functions in component API 144 necessary to perform the operation.

In step 240, responsive data from component 140 is received. The responsive data is transmitted from component 140 to programmatic agent 130. In an embodiment, component API 144 transmits the responsive data to component XML 142 after performing the one or more functions associated with the operation. Thereafter, component XML 142 transmits the responsive data to programmatic agent 130. Responsive data may include a set of results in response to the operation. When the operation cannot be performed, responsive data may include information that would allow the application to determine why the operation could not be performed, e.g., responsive data may include an error code.

In step 250, a responsive XML document that contains the responsive data in XML format is created. In step 250, programmatic agent 130 creates the responsive XML document using the responsive data received from step 240.

In step 260, the responsive XML document is transmitted to application 110. Programmatic agent 130 transmits the responsive XML document to transport agent 120, which in turn transmits the responsive XML document to application 110.

Embodiments of the invention may be used to perform an operation on one or more objects supported by component 140. For example, application 110 may transmit a payload containing a XML document containing an operation querying the identity of one or more objects supported by component 140. Component 140, upon processing the operation, transmits responsive data that identifies the one or more objects supported by component 140 to programmatic agent 130. Programmatic agent 130 creates a responsive XML document containing the responsive data, and transmits the responsive XML document to transport agent 120, which in turn transports the responsive XML document to application 110. Accordingly, application 110 essentially has direct access to functions of the operation system, and may perform an operation on one or more objects supported by component 140 using a single protocol, XML, which component 140 is not required to understand.

Embodiments of the invention may be used to perform an operation using one or more methods on one or more objects that are supported by component 140. For example, application 110 may transmit a payload containing a XML document containing an operation querying the identity of one or more methods on one or more objects supported by component 140. Component 140, upon processing the operation, transmits a responsive data that identifies the one or more methods supported by component 140 to programmatic agent 130. Programmatic agent 130 creates a responsive XML document containing the responsive data, and transmits the responsive XML document to transport agent 120, which in turn transports the responsive XML document to application 110. Accordingly, application 110 perform an operation using one or more methods on one or more objects supported by component 140 using a single protocol, XML, which component 140 is not required to understand.

Embodiments of the invention may be used to perform an operation on one or more attributes of one or more objects that are supported by component 140. For example, application 110 may transmit a payload containing a XML document containing an operation querying the identity of one or more attributes of one or more objects supported by component 140. Component 140, upon processing the operation, transmits a responsive data that identifies the one or more attributes supported by component 140 to programmatic agent 130. Programmatic agent 130 creates a responsive XML document containing the responsive data, and transmits the responsive XML document to transport agent 120, which in turn transports the responsive XML document to application 110. Accordingly, application 110 may perform an operation on one or more attributes of one or more objects supported by component 140 using a single protocol, XML, which component 140 is not required to understand.

Embodiments of the invention provide for transmitting multiple operations in a single XML document from application 110 to component 140. For example, a single XML document may include an add operation, an enable operation, a get operation, a delete operation, a disable operation, and a modify operation. Embodiments may include any number and type of operations. For example, a XML document transmitted from application 110 may include an add operation, but not an enable operation. The one or more operations specified in the XML document transmitted in step 210 may be specified at any level of granularity.

Implementing Mechanisms

Figure 4:
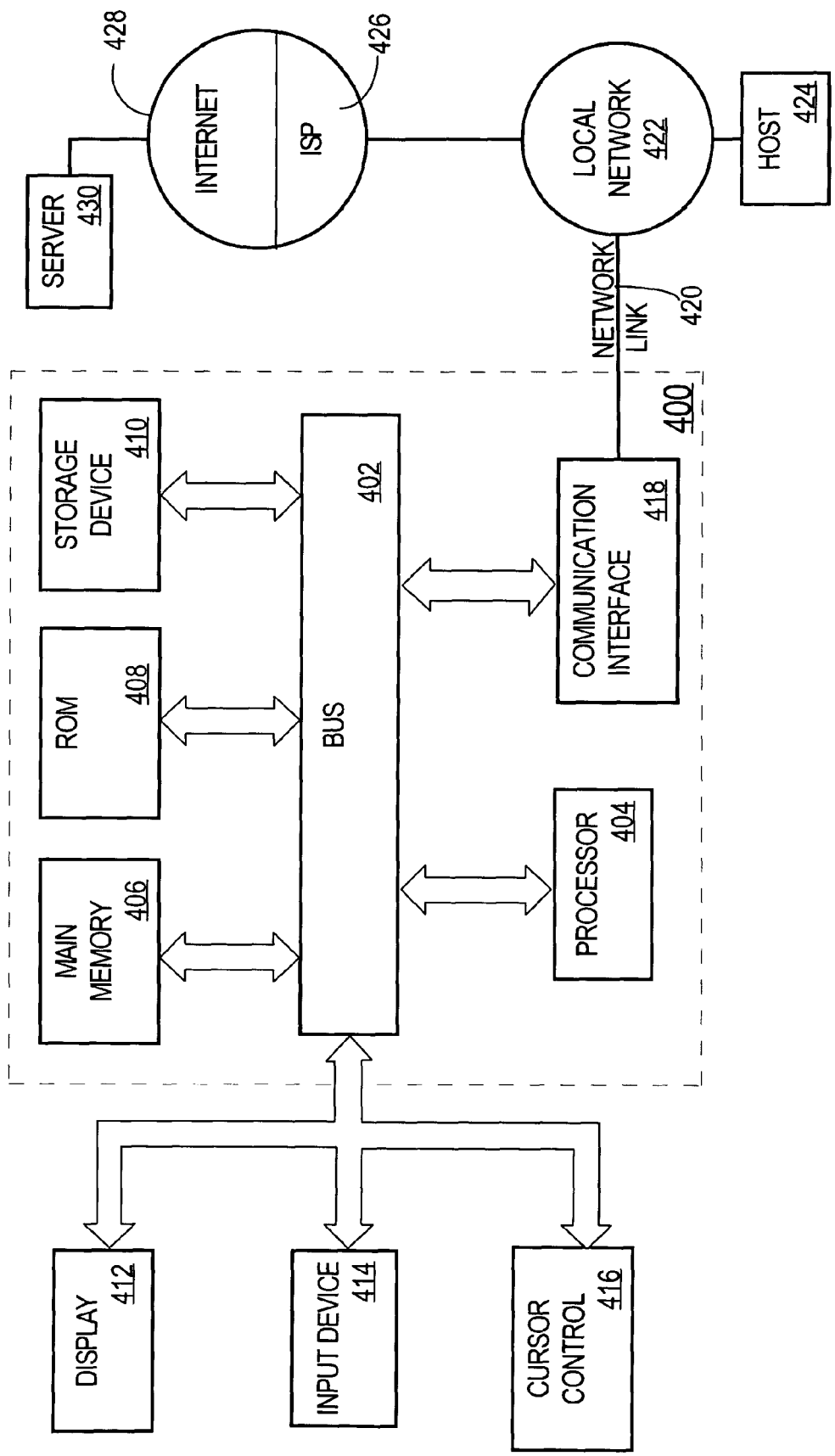
FIG. 4 is a block diagram that illustrates a computer system upon which an embodiment may be implemented.

FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing a network device operating system operation, the method comprising the computer-implemented steps of:

receiving, from each of several network device operating system components, callback registration information that specifies the network device operating system operations supported by the network device operating system component and that establishes a callback for providing (a) a network device operating system operation and (b) data associated with the operation to the network device operating system component;

receiving (a) the network device operating system operation and (b) data associated with the operation within an Extensible Markup Language (XML) document;

parsing the XML document to identify the network device operating system operation;

selecting, based on the callback registration information, one of the several network device operating system components that supports the identified network device operating system operation, where the callback registration information received from the selected one of several network device operating system components specifies that the identified network device operating system operation is supported by the selected one of several network device operating system components;

preparing the data associated with the operation for use by the selected one of several network device operating system component;

providing the identified network device operating system operation and the prepared data in the callback;

receiving, from the selected one of the several network device operating system components, responsive data that reflects the results of performing the identified network device operating system operation;

creating a responsive XML document that contains the responsive data in XML format; and sending the responsive XML document to a network management application.

2. The method of claim 1, wherein the XML document is received within a transport protocol message that conforms to one of several transport protocols, and further comprising the step of extracting the XML document from the transport protocol message.

3. The method of claim 1, further comprising the steps of:

at the selected one of the several network device operating system components, processing the identified network device operating system operation in preparation for invoking a function that can perform one or more tasks associated with the operation; and invoking the function defined by the network device operating system component that can perform the one or more tasks associated with the operation.

4. The method of claim 3, wherein the XML document includes data associated with the network device operating system operation, and wherein the step of processing the identified network device operating system operation in preparation for invoking the function comprises:

validating the data associated with the network device operating system operation; and mapping the data to one or more data structures that are associated with the function.

5. The method of claim 1, further comprising the steps of:

receiving, in the XML document, a query from a network management application about the several network device operating system components that are supported; and providing a response to the network management application that identifies one or more of the several network device operating system components that are supported.

6. The method of claim 1, further comprising the steps of:

receiving, in the XML document, a query from a network management application about one or more of several objects that are supported by the several components; and providing a response to the network management application that identifies one or more of the objects that are supported.

7. The method as recited in claim 6, further comprising the steps of:

receiving, in the XML document, a query from a network management application about one or more of several methods that are supported by the objects; and providing a response to the network management application that identifies one or more of the methods that are supported.

8. The method as recited in claim 6, further comprising the steps of:

receiving, in the XML document, a query from a network management application about one or more of several attributes that are supported by the methods; and providing a response to the network management application that identifies one or more of the attributes that are supported.

9. The method as recited in claim 1, further comprising the steps of:

receiving, in the XML document, an invocation by a network management application of one or more of several methods that are implemented by one or more objects of the several components; and invoking the one or more methods through a callback to one or more of the components.

10. A computer-readable storage medium for processing a network operating system operation for a network device, comprising:

a plurality of network device operating system components comprising instructions for performing network device operating system operations;

XML infrastructure logic comprising instructions for receiving (a) a network operating system operation and (b) data associated with the operation within an Extensible Markup Language (XML) document; and programmatic agent infrastructure logic comprising instructions for, receiving, from each of several network device operating system components, callback registration information that specifies the network device operating system operations supported by the network device operating system component and that establishes a callback for providing (a) the network device operating system operation and (b) data associated with the operation to the network device operating system component, parsing the XML document to identify the network device operating system operation, selecting one of the several network device operating system components that supports the identified network device operating system operation, where the callback registration information received from the selected one of several network device operating system components specifies that the identified network device operating system operation is supported by the selected one of several network device operating system components, preparing the data associated with the operation for use by the selected one of several network device operating system component, and providing the identified network device operating system operation and the prepared data in the callback established by the selected network device operating system component, wherein each of the network device operating system components comprises (1) component XML logic that implements one or more of the callbacks to which the identified network device operating system operation and the prepared data are provided by the programmatic agent infrastructure logic and (2) component API logic that provides an application programming interface for one or more functions of the network device operating system component.

11. The computer-readable storage medium as recited in claim 10, wherein the component XML logic further comprises instructions for data validation of the data associated with the identified network device operating system operation and for mapping the data to one or more data structures that are associated with the one or more functions.

12. A computer-readable storage medium storing one or more sequences of instructions for processing a network device operating system operation, which instructions, when executed by one or more processors, cause the one or more processors to perform the steps of:

receiving, from each of several network device operating system components, callback registration information that specifies the network device operating system operations supported by the network device operating system component and that establishes a callback for providing (a) a network device operating system operation and (b) data associated with the operation to the network device operating system component;

receiving (a) the network device operating system operation and (b) data associated with the operation within an Extensible Markup Language (XML) document;

parsing the XML document to identify the network device operating system operation;

selecting, based on the callback registration information, one of the several network device operating system components that supports the identified network device operating system operation, where the callback registration information received from the selected one of several network device operating system components specifies that the identified network device operating system operation is supported by the selected one of several network device operating system components;

preparing the data associated with the operation for use by the selected one of several network device operating system component;

providing the identified network device operating system operation and the prepared data in the callback established by the selected network device operating system component;

receiving, from the selected one of the several network device operating system components, responsive data that reflects the results of performing the identified network device operating system operation;

creating a responsive XML document that contains the responsive data in XML format; and sending the responsive XML document to a network management application.

13. The computer-readable storage medium as recited in claim 12, wherein the XML document is received within a transport protocol message that conforms to one of several transport protocols, and further comprising instructions, which when executed by the one or more processors, cause the one or more processors to perform the step of extracting the XML document from the transport protocol message.

14. The computer-readable storage medium as recited in claim 12, further comprising instructions, which when executed by the one or more processors, cause the one or more processors to perform the steps of:

at the selected one of the several network device operating system components, processing the identified network device operating system operation in preparation for invoking a function that can perform one or more tasks associated with the operation; and invoking the function defined by the network device operating system component that can perform the one or more tasks associated with the operation.

15. The computer-readable storage medium as recited in claim 14, wherein the XML document includes data associated with the network device operating system operation, and wherein the step of processing the identified network device operating system operation in preparation for invoking the function comprises:

validating the data associated with the network device operating system operation; and mapping the data to one or more data structures that are associated with the function.

16. The computer-readable storage medium as recited in claim 12, further comprising instructions, which when executed by the one or more processors, cause the one or more processors to perform the steps of:

receiving, in the XML document, a query from a network management application about the several network device operating system components that are supported; and providing a response to the network management application that identifies one or more of the several network device operating system components that are supported.

17. The computer-readable storage medium as recited in claim 12, further comprising instructions, which when executed by the one or more processors, cause the one or more processors to perform the steps of:

receiving, in the XML document, a query from a network management application about one or more of several objects that are supported by the several components; and providing a response to the network management application that identifies one or more of the objects that are supported.

18. The computer-readable storage medium as recited in claim 17, further comprising instructions, which when executed by the one or more processors, cause the one or more processors to perform the steps of:

receiving, in the XML document, a query from a network management application about one or more of several methods that are supported by the objects; and providing a response to the network management application that identifies one or more of the methods that are supported.

19. The computer-readable storage medium as recited in claim 17, further comprising instructions, which when executed by the one or more processors, cause the one or more processors to perform the steps of:

receiving, in the XML document, a query from a network management application about one or more of several attributes that are supported by the methods; and providing a response to the network management application that identifies one or more of the attributes that are supported.

20. The computer-readable storage medium as recited in claim 12, further comprising instructions, which when executed by the one or more processors, cause the one or more processors to perform the steps of:

receiving, in the XML document, an invocation by a network management application of one or more of several methods that are implemented by one or more objects of the several components; and invoking the one or more methods through a callback to one or more of the components.

21. An apparatus for processing a network device operating system operation, comprising:

at least one processor;

means for receiving, from each of several network device operating system components, callback registration information that specifies the network device operating system operations supported by the network device operating system component and that establishes a callback for providing (a) a network device operating system operation and (b) data associated with the operation to the network device operating system component;

means for receiving (a) the network device operating system operation and (b) data associated with the operation within an Extensible Markup Language (XML) document;

means for parsing the XML document to identify the network device operating system operation;

means for selecting, based on the callback registration information, one of the several network device operating system components that supports the identified network device operating system operation, where the callback registration information received from the selected one of several network device operating system components specifies that the identified network device operating system operation is supported by the selected one of several network device operating system components;

means for preparing the data associated with the operation for use by the selected one of several network device operating system component;

means for providing the identified network device operating system operation and the prepared data in the callback established by the selected network device operating system component;

means for receiving, from the selected one of the several network device operating system components, responsive data that reflects the results of performing said identified network device operating system operation;

means for creating a responsive XML document that contains the responsive data in XML format; and means for sending the responsive XML document to a network management application.

22. The apparatus of claim 21, wherein the XML document is received within a transport protocol message that conforms to one of several transport protocols, and further comprising means for extracting the XML document from the transport protocol message.

23. The apparatus of claim 21, further comprising:

means for processing the identified network device operating system operation in preparation for invoking a function that can perform one or more tasks associated with the operation; and means for invoking the function defined by the network device operating system component that can perform the one or more tasks associated with the operation.

24. The apparatus of claim 23, wherein the XML document includes data associated with the network device operating system operation, and wherein the means for processing the identified network device operating system operation in preparation for invoking the function comprises:

means for validating the data associated with the network device operating system operation; and means for mapping the data to one or more data structures that are associated with the function.

25. The apparatus of claim 21, further comprising:

means for receiving, in the XML document, a query from a network management application about the several network device operating system components that are supported; and means for providing a response to the network management application that identifies one or more of the several network device operating system components that are supported.

26. The apparatus of claim 21, further comprising:

means for receiving, in the XML document, a query from a network management application about one or more of several objects that are supported by the several components; and means for providing a response to the network management application that identifies one or more of the objects that are supported.

27. The apparatus of claim 26, further comprising the steps of:

means for receiving, in the XML document, a query from a network management application about one or more of several methods that are supported by the objects; and means for providing a response to the network management application that identifies one or more of the methods that are supported.

28. The apparatus of claim 26, further comprising the steps of:

means for receiving, in the XML document, a query from a network management application about one or more of several attributes that are supported by the methods; and means for providing a response to the network management application that identifies one or more of the attributes that are supported.

29. The apparatus of claim 21, further comprising:

means for receiving, in the XML document, an invocation by a network management application of one or more of several methods that are implemented by one or more objects of the several components; and means for invoking the one or more methods through a callback to one or more of the components.

30. An apparatus for processing a network device operating system operation, comprising:

a network interface that is coupled to a data network for receiving one or more packet flows therefrom;

a processor; and one or more stored sequences of instructions which, when executed by the processor, cause the processor to perform the steps of:

receiving, from each of several network device operating system components, callback registration information that specifies the network device operating system operations supported by the network device operating system component and that establishes a callback for providing (a) a network device operating system operation and (b) data associated with the operation to the network device operating system component;

receiving (a) the network device operating system operation and (b) data associated with the operation within an Extensible Markup Language (XML) document;

parsing the XML document to identify the network device operating system operation;

selecting, based on the callback registration information, one of the several network device operating system components that supports the identified network device operating system operation, where the callback registration information received from the selected one of several network device operating system components specifies that the identified network device operating system operation is supported by the selected one of several network device operating system components;

preparing the data associated with the operation for use by the selected one of several network device operating system component;

providing the identified network device operating system operation and the prepared data in the callback established by the selected network device operating system component;

receiving responsive data that reflects the results of performing said identified network device operating system operation from the selected one of the several network device operating system components;

creating a responsive XML document that contains the responsive data in XML format; and sending the responsive XML document to a network management application.

31. The apparatus of claim 30, wherein the XML document is received within a transport protocol message that conforms to one of several transport protocols, and further comprising instructions, which when executed by the processor, cause the processor to perform the step of extracting the XML document from the transport protocol message.

32. The apparatus of claim 30, further comprising instructions, which when executed by the processor, cause the processor to perform the steps of:

at the selected one of the several network device operating system components, processing the identified network device operating system operation in preparation for invoking a function that can perform one or more tasks associated with the operation; and invoking the function defined by the network device operating system component that can perform the one or more tasks associated with the operation.

33. The apparatus of claim 32, wherein the XML document includes data associated with the network device operating system operation, and wherein the step of processing the identified network device operating system operation in preparation for invoking the function comprises:

validating the data associated with the network device operating system operation; and mapping the data to one or more data structures that are associated with the function.

34. The apparatus of claim 30, further comprising instructions, which when executed by the processor, cause the processor to perform the steps of:

receiving, in the XML document, a query from a network management application about the several network device operating system components that are supported; and providing a response to the network management application that identifies one or more of the several network device operating system components that are supported.

35. The apparatus of claim 30, further comprising instructions, which when executed by the processor, cause the processor to perform the steps of:

receiving, in the XML document, a query from a network management application about one or more of several objects that are supported by the several components; and providing a response to the network management application that identifies one or more of the objects that are supported.

36. The apparatus of claim 35, further comprising instructions, which when executed by the processor, cause the processor to perform the steps of:

receiving, in the XML document, a query from a network management application about one or more of several methods that are supported by the objects; and providing a response to the network management application that identifies one or more of the methods that are supported.

37. The apparatus of claim 35, further comprising instructions, which when executed by the processor, cause the processor to perform the steps of:

receiving, in the XML document, a query from a network management application about one or more of several attributes that are supported by the methods; and providing a response to the network management application that identifies one or more of the attributes that are supported.

38. The apparatus of claim 30, further comprising instructions, which when executed by the processor, cause the processor to perform the steps of:

receiving, in the XML document, an invocation by a network management application of one or more of several methods that are implemented by one or more objects of the several components; and invoking the one or more methods through a callback to one or more of the components.

* * * * *